(12) United States Patent
Wang

(10) Patent No.: US 8,355,183 B2
(45) Date of Patent: *Jan. 15, 2013

(54) SCANNING SPEED CONTROL DEVICE AND METHOD

(75) Inventor: Kuo-Jeng Wang, Kaohsiung (TW)

(73) Assignee: Transpacific Systems, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/768,701

(22) Filed: Apr. 27, 2010

(65) Prior Publication Data

US 2012/0075680 A1    Mar. 29, 2012

Related U.S. Application Data

(63) Continuation of application No. 11/512,510, filed on Aug. 29, 2006, now Pat. No. 7,800,793, which is a continuation of application No. 09/920,387, filed on Jul. 31, 2001, now Pat. No. 7,248,387.

(51) Int. Cl.
*H04N 1/04* (2006.01)

(52) U.S. Cl. ......... 358/474; 358/486; 358/497; 399/210

(58) Field of Classification Search .................. 358/474, 358/486, 497, 496, 404; 399/208, 177, 209, 399/210

See application file for complete search history.

(56) References Cited

U.S. PATENT DOCUMENTS

| | | | |
|---|---|---|---|
| 4,169,273 A | 9/1979 | Hendrickson | |
| 4,169,275 A | 9/1979 | Gunning | |
| 4,638,156 A | 1/1987 | Horikawa et al. | |
| 4,700,066 A | 10/1987 | Horikawa | |
| 4,748,514 A * | 5/1988 | Bell | 358/486 |
| 4,833,531 A | 5/1989 | Abe et al. | |
| 4,894,732 A | 1/1990 | Ueda | |
| 5,018,716 A | 5/1991 | Yoshida et al. | |
| 5,220,437 A * | 6/1993 | Saegusa et al. | 358/404 |
| 5,224,089 A | 6/1993 | Matsumura et al. | |
| 5,289,000 A | 2/1994 | Toyofuku | |
| 5,369,504 A * | 11/1994 | Walker | 358/437 |
| 5,381,020 A | 1/1995 | Kochis et al. | |
| 5,517,331 A | 5/1996 | Murai et al. | |
| 5,572,335 A * | 11/1996 | Stevens | 358/442 |
| 5,629,017 A | 5/1997 | Pozzi et al. | |
| 5,785,918 A * | 7/1998 | Hull | 264/401 |
| 5,805,312 A * | 9/1998 | Ozawa et al. | 358/503 |
| 5,815,502 A | 9/1998 | Saito et al. | |
| 5,825,512 A | 10/1998 | Okita | |
| 5,943,139 A | 8/1999 | Tang et al. | |

(Continued)

OTHER PUBLICATIONS

Stolowitz Ford Cowger LLP; Related Case Listing; Nov. 7, 2011; 1 Page.

*Primary Examiner* — Negussie Worku
(74) *Attorney, Agent, or Firm* — Stolowitz Ford Cowger LLP

(57) ABSTRACT

A control device and a method for controlling scanning speed of a scanner. The control device includes a decision device and a driving device. The decision device further includes an image buffer, an up-down counter and a comparator. The decision device receives the input image data and utilizes the up-down counter to compute data access volume inside the image buffer. The comparator decides whether to increase or decrease the scanning speed according to the data access volume and also outputs decision data to the driving device.

19 Claims, 2 Drawing Sheets

U.S. PATENT DOCUMENTS

| | | | |
|---|---|---|---|
| 5,956,158 A | 9/1999 | Pinzarrone et al. | |
| 6,115,149 A | 9/2000 | Lai et al. | |
| 6,147,776 A | 11/2000 | Sakurai et al. | |
| 6,160,636 A | 12/2000 | Nagano et al. | |
| 6,262,816 B1 | 7/2001 | Rindsig et al. | |
| 6,335,807 B1* | 1/2002 | Neale et al. | 358/486 |
| 6,459,506 B1 | 10/2002 | Hu | |
| 6,490,057 B1* | 12/2002 | Sakaguchi | 358/412 |
| 6,515,774 B2 | 2/2003 | Horiuchi et al. | |
| 6,525,843 B1 | 2/2003 | Yu | |
| 6,557,109 B1 | 4/2003 | Sato | |
| 6,573,976 B2* | 6/2003 | Takeishi | 355/55 |
| 6,661,541 B1 | 12/2003 | Chang | |
| 6,665,082 B1 | 12/2003 | Takeoka et al. | |
| 6,754,463 B2* | 6/2004 | Nishikino et al. | 399/208 |
| 6,958,832 B1* | 10/2005 | Murata | 358/474 |
| 6,958,835 B2 | 10/2005 | Sakakibara et al. | |
| 7,103,495 B2* | 9/2006 | Kiryu | 702/117 |
| 7,133,068 B2* | 11/2006 | Fisher et al. | 348/218.1 |
| 7,248,387 B2* | 7/2007 | Wang | 358/474 |
| 7,542,612 B2* | 6/2009 | Kitamura | 382/232 |
| 7,566,886 B2* | 7/2009 | Eisner et al. | 250/492.21 |
| 7,675,653 B2* | 3/2010 | Jung et al. | 358/468 |
| 7,742,201 B2 | 6/2010 | Murata | |
| 7,742,220 B2 | 6/2010 | Kogut et al. | |
| 7,800,793 B2* | 9/2010 | Wang | 358/474 |
| 7,903,097 B2* | 3/2011 | Watari | 345/175 |
| 8,218,183 B2* | 7/2012 | Wang | 358/1.15 |
| 2001/0035985 A1 | 11/2001 | Takahashi et al. | |
| 2003/0013424 A1* | 1/2003 | Adrain | 455/161.1 |
| 2004/0252323 A1 | 12/2004 | Mimamino | |
| 2005/0162715 A1 | 7/2005 | Murata | |
| 2005/0184448 A1* | 8/2005 | Aoyagi et al. | 271/110 |
| 2006/0290996 A1 | 12/2006 | Nishida et al. | |
| 2006/0290998 A1 | 12/2006 | Jung et al. | |
| 2007/0047015 A1 | 3/2007 | Yamada | |

* cited by examiner

SCANNING SPEED CONTROL DEVICE AND METHOD

This invention is a continuation of U.S. patent application Ser. No. 11/512,510, filed Aug. 29, 2006, now issued as U.S. Pat. No. 7,800,793, which is a continuation of U.S. patent application Ser. No. 09/920,387 filed Jul. 31, 2001, now issued as U.S. Pat. No. 7,248,387, issued Jul. 24, 2007, which are all herein incorporated by reference in their entirety.

BACKGROUND OF THE INVENTION

1. Field of Invention

The present invention relates to a scanning control device and a scanning speed control method. More particularly, the present invention relates to a scanning speed control device and a scanning speed control method.

2. Description of Related Art

Due to rapid progress in office equipment technologies, various types of complementary systems including the auto-document feeder (ADF) are developed. An auto-document feeder (ADF) can be applied to different types of machines such as a printer, a photocopier or a scanner so that paper is fed into the machine without manual labor. If the auto-feeder contains papers, the processor unit (a processor or an application specific integrated circuit) inside the machine detects the presence of papers through sensors. When a machine having an auto-feeder needs paper, paper is automatically fed into the machine according to controlling signal produced by the processor unit. Thus, auto-feeder facilitates the operation of most machines. However, when an auto-feeder is applied to a scanner, due to special design condition of the mechanism used by the auto-feeder, forward and backward scanning by the scanner is restricted.

SUMMARY OF THE INVENTION

Accordingly, one object of the present invention is to provide scanning speed control device that controls the running speed of a motor and reduces probability of moving forward and backward without sacrificing scanning speed. An up-down counter is used to record current transaction volume of an image buffer so that an appropriate scanning speed can be set to optimize the scanning speed.

To achieve these and other advantages and in accordance with the purpose of the invention, as embodied and broadly described herein, the invention provides a control device for controlling the scanning speed of a scanner. The control device includes a decision device, a driving device and an input/output interface. The decision device receives input image data and transmits decision data and output image data. The driving device receives decision data and the input/output interface receives the output image data.

The decision device of this invention controls the scanning speed. The decision device includes an image buffer, an up-down counter and a comparator. The image buffer receives the input image data stores the data temporarily in a register and finally transmits output image data. The up-down counter computes and records amount of data accessed through the image buffer, and then outputs count data. The comparator receives the count data and decides to increase or decrease current scanning speed according to the count data and finally outputs the decision data.

This invention also provides a method of controlling scanning speed of a scanner. First, count data and the largest data access volume are provided. According to a ratio between the count data and the largest data access volume, the scanning speed of the scanner is set.

In brief, utilizing the data access volume of the image buffer and the count data to the comparator, the comparator can determine if a paper is in the initial feed state, the intermediate state or the terminal-scanning state so that a different scanning speed appropriate to the particular state is employed.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
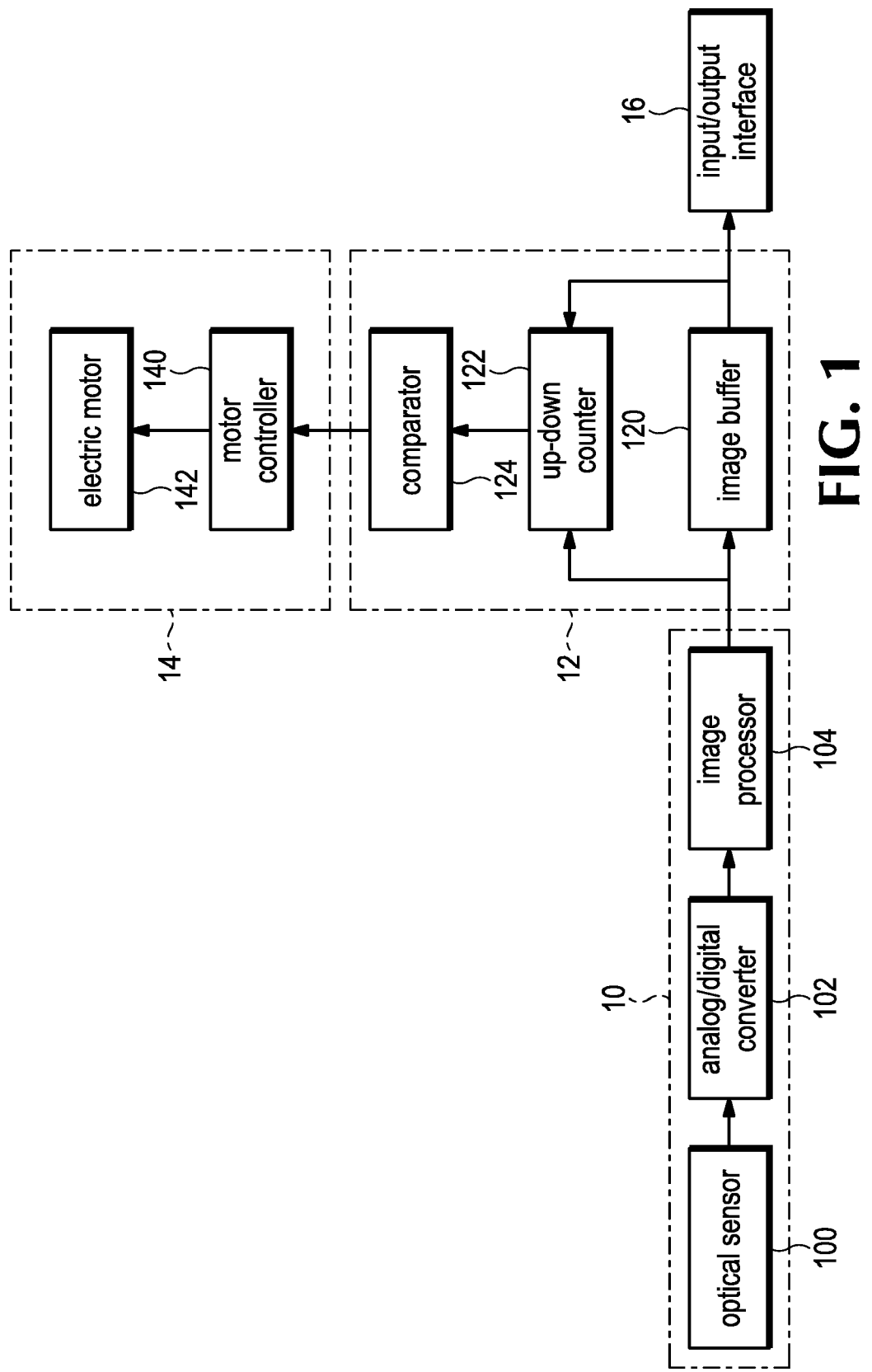
FIG. 1 is a schematic block diagram showing a scanning speed control device according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic block diagram showing a scanning speed control device according to one preferred embodiment of this invention. As shown in FIG. 1, the control device includes an input device 10, a decision device 12, a driving device 14 and an input/output interface 16. The input device 10 further includes an optical sensor 100, an analog/digital converter 102 and an image processor 104. The decision device 12 further includes an image buffer 120, a counter 122 and a comparator 124. The driving device 14 further includes a motor controller 140 and an electric motor 142.

The analog/digital converter 102 couples with the optical sensor 100. The image processor 104 couples with the analog/digital converter 102 and the image buffer 120. The image buffer 120 couples with the input/output interface 16. The up-down counter 122 couples with the input terminal of the image buffer 120 and the output terminal of the image buffer 120. The comparator 124 couples with the up-down counter 122 and the motor controller 140. The motor controller 140 couples with the electric motor 142.

To conduct a scanning operation, the optical sensor 100 utilizes a charge coupled device (CCD) to detect any external signal. Each CCD cell converts the intensity of light into an electrical current. The electric current transforms into signal charges and finally appears as a voltage potential. Eventually an analog signal is produced. The analog signal is output from the optical sensor 100 to the analog/digital converter 102. As soon as the analog/digital converter 102 receives the analog signal, the analog signal is converted to a digital signal and the digital signal is immediately transferred to the image processor 104. Inside the image processor 104, the digital signal is processed and converted into input image data. The input image data is transferred to the image buffer 120 and the up-down counter 122.

When the image processor 104 outputs input image data to the image buffer 120, the up-down counter 122 enables its up-counting function so that one is added to the value inside the counter 122. Similarly, when the up-down counter senses the transfer of an output image data to the input/output interface 16, the up-down counter 122 enable its down-counting function so that one is deducted from the value inside the counter 122. After updating the count data within the up-down counter 122, the count data is transmitted to the comparator 124. In this embodiment, only one type of counting method is illustrated. Obviously, other types of counting methods are available for selection. The up-down counter 122 is a device for computing and recording data access volume of the image buffer 120 and outputting count data to the comparator 124.

The comparator 124 decides to increase or slow down the scanning speed according to the received count data and outputs decision data to the motor controller 140. The motor controller 140 controls the running speed of the electric motor 142 according to the decision data. For example, if the amount of count data in the image buffer 120 drops, this indicates the scanning is near completion. The comparator 124 informs the motor controller 140, via the decision data, to slow down the electric motor 142.

The comparator in FIG. 1 indicates the need for a method for deciding whether to increase or decrease the scanning speed of a scanner. The following is an illustration of such a decision method.

Figure 2:
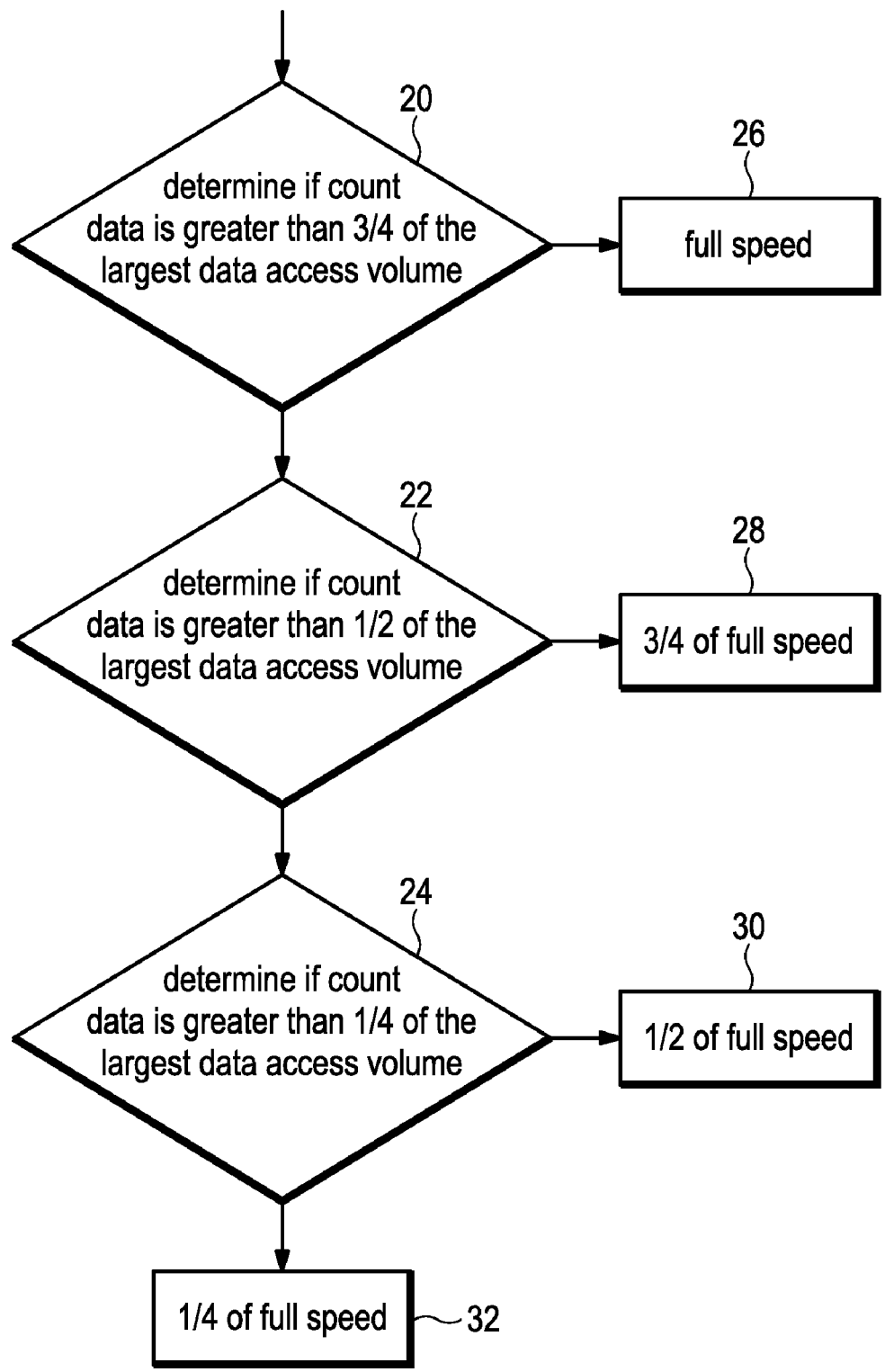
FIG. 2 is a flow diagram showing the method of controlling the scanning speed of a scanner according to one preferred embodiment of this invention.

FIG. 2 is a flow diagram showing the method of controlling the scanning speed of a scanner according to one preferred embodiment of this invention. First, count data and the largest data access volume is provided. According to a ratio of the count data over the largest data access volume, a scanning speed is set. Thereafter, as shown in FIG. 2, step 20 is executed so that whether the count data is greater than ¾ of the largest data access volume is checked. If the count data is greater than ¾ of the largest data access volume, step 26 is executed so that the scanning speed is adjusted to full speed. On the other hand, if the count data is smaller than ¾ of the largest data access volume, step 22 is executed to determine if the count data is greater or smaller than ½ of the largest data access volume. If the count data is greater than ½ of the largest data access volume, step 28 is executed such that the scanning speed is set to ¾ of the full speed. On the other band, if the count data is smaller than ½ of the largest data access volume, step 24 is executed to determine if the count data is greater or smaller than ¼ of the largest data access volume. If the count data is greater than ¼ of the largest data access volume, step 30 is executed such that the scanning speed is set to ½ of the full speed. On the other hand, if the count data is smaller than ¼ of the largest data access volume, step 32 is executed such that the scanning speed is set to ¼ of the full speed. In practice, anybody familiar with such technique is free to decide the relationship between the scanning speed of the scanner and the data count/largest data access volume ratio.

In conclusion, one major advantage of this invention is the variation of scanning speed according to the stored data inside the image buffer so that an optimal scanning speed can be maintained even if forward/backward scanning is restricted.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus, comprising:
   a first device configured to select a scanning speed value from a plurality of predetermined scanning speed values based at least on an amount of image data to be generated during a scanning operation; and
   a second device configured to control a scanning speed of a scanner based on the scanning speed value.

2. The apparatus of claim 1, wherein the amount of image data to be generated is for an un-scanned portion of a document.

3. The apparatus of claim 1, further comprising a buffer configured to store the image data during the scanning operation, wherein the first device is further configured to select the scanning speed value based at least on a storage capacity of the buffer.

4. The apparatus of claim 3, wherein the first device is further configured to select the scanning speed value based at least on an amount of the storage capacity available for storing the image data.

5. The apparatus of claim 1, wherein the first device is further configured to select a first one of the predetermined scanning speed values as the scanning speed value if the amount of image data is above a first threshold.

6. The apparatus of claim 5, wherein the first device is further configured to select a second one of the predetermined scanning speed values as the scanning speed value if the amount of image data is below the first threshold and is above a second threshold, and to select a third one of the predetermined scanning speed values as the scanning speed value if the amount of image data is below the second threshold.

7. The apparatus of claim 1, wherein the first device is further configured to select a first one of the predetermined scanning speed values as the scanning speed value if the amount of image data is within a first range, and to select a second one of the predetermined scanning speed values as the scanning speed value if the amount of image data is within a second range.

8. The apparatus of claim 7, wherein the first device is further configured to select a third one of the predetermined scanning speed values as the scanning speed value if the amount of image data is within a third range.

9. An apparatus, comprising:
   means for identifying an approximate amount of data to be scanned in a scanning operation, wherein the approximate amount of data corresponds with a document that is at least partially un-scanned;
   means for selecting a scanning speed value from a plurality of predetermined scanning speed values based at least on the approximate amount of data; and
   means for controlling a scanning speed of a scanning operation based at least on the scanning speed value.

10. The apparatus of claim 9, wherein said means for selecting is further configured to select a first one of the plurality of scanning speed values as the scanning speed value if the approximate amount of data is within a first range, and to select a second one of the different scanning speed values as the scanning speed value if the approximate amount of data is within a second range.

11. The apparatus of claim 10 wherein the plurality of scanning speed values are predetermined scanning speed values.

12. The apparatus of claim 9, wherein said means for selecting is further configured to select the scanning speed value based on a storage capacity of a buffer, wherein the buffer is configured to store image data from the scanning operation.

13. An apparatus, comprising:
a logic circuit configured to:
receive an input signal corresponding with an amount of data expected in a subsequent scanning operation;
select a scanning speed value from a plurality of predetermined scanning speed values based at least on the input signal; and
control a scanning operation based at least on the scanning speed value.

14. The apparatus of claim 13, wherein the amount of data corresponds to at least a portion of a document that is unscanned.

15. The apparatus of claim 13, wherein the logic circuit is further configured to select a first one of the predetermined scanning speed values as the scanning speed value if the amount of data is within a first range, and to select a second one of the predetermined scanning speed values as the scanning speed value if the amount of data is within a second range.

16. The apparatus of claim 15 wherein the first one of the predetermined scanning speed values is associated with a full scanning speed and the second one of the predetermined scanning speed values is associated with a slower scanning speed.

17. The apparatus of claim 13 further comprising a buffer configured to store image data generated from the scanning operation.

18. The apparatus of claim 17, wherein the logic circuit is further configured to select the scanning speed value based at least on an available storage capacity of the buffer.

19. The apparatus of claim 18, wherein the logic circuit is further configured to predict an amount of remaining scanning in the scanning operation based on the available storage capacity of the buffer.

* * * * *

UNITED STATES PATENT AND TRADEMARK OFFICE
CERTIFICATE OF CORRECTION

| | |
|---|---|
| PATENT NO. | : 8,355,183 B2 |
| APPLICATION NO. | : 12/768701 |
| DATED | : January 15, 2013 |
| INVENTOR(S) | : Wang |

Page 1 of 1

It is certified that error appears in the above-identified patent and that said Letters Patent is hereby corrected as shown below:

In the Specification

In Column 2, Line 30, delete "DESCRIPTION" and insert -- DETAILED DESCRIPTION --, therefor.

In Column 3, Line 4, insert -- When the image buffer 120 receives the input image data, the input image data is temporarily stored. After complete processing of the input image data inside the image buffer 120, the input image data is converted to output image data and then the output image data is transferred to the input/output interface 16 and the up-down counter 122. --, as a new paragraph.

In Column 3, Line 38, delete "than %" and insert -- than 3/4 --, therefor.

Signed and Sealed this
Eleventh Day of March, 2014

Michelle K. Lee
*Deputy Director of the United States Patent and Trademark Office*